United States Patent
Eisman et al.

(10) Patent No.: US 6,280,865 B1
(45) Date of Patent: Aug. 28, 2001

(54) FUEL CELL SYSTEM WITH HYDROGEN PURIFICATION SUBSYSTEM

(75) Inventors: Glenn A Eisman, Niskayuna, NY (US); James F. McElroy, Suffield, CT (US); Norman Peschke, Clifton Park, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/405,685

(22) Filed: Sep. 24, 1999

(51) Int. Cl.⁷ ........................................................ H01M 8/04
(52) U.S. Cl. .................. 429/17; 429/12; 429/13; 429/19; 429/22; 429/25; 429/53
(58) Field of Search .................. 429/12, 13, 17, 429/19, 22, 25, 53

(56) References Cited

U.S. PATENT DOCUMENTS

| | | |
|---|---|---|
| 4,324,761 | 4/1982 | Harris . |
| 4,373,375 | 2/1983 | Terhune et al. . |
| 4,657,829 * | 4/1987 | McElroy et al. ........................ 429/19 |
| 4,664,757 | 5/1987 | Zupancic et al. . |
| 4,689,122 | 8/1987 | Polak et al. . |
| 4,751,151 | 6/1988 | Healy et al. . |
| 4,766,044 | 8/1988 | Sederquist . |
| 4,795,536 | 1/1989 | Young et al. . |
| 4,797,185 | 1/1989 | Polak et al. . |
| 4,824,528 | 4/1989 | Polak et al. . |
| 4,879,005 | 11/1989 | Fray et al. . |
| 4,886,048 | 12/1989 | Labaton et al. . |
| 4,921,651 | 5/1990 | Polak et al. . |
| 4,950,371 | 8/1990 | McElroy . |
| 5,012,672 | 5/1991 | McKee . |
| 5,122,239 | 6/1992 | McElroy et al. . |
| 5,256,443 | 10/1993 | Tomita . |
| 5,338,708 | 8/1994 | Felten . |
| 5,367,283 | 11/1994 | Lauf et al. . |
| 5,451,920 | 9/1995 | Hoffheins et al. . |
| 5,505,824 | 4/1996 | McElroy . |
| 5,520,789 | 5/1996 | Takahashi et al. . |
| 5,670,115 | 9/1997 | Cheng et al. . |
| 5,886,614 | 3/1999 | Cheng et al. . |
| 6,007,931 | 12/1999 | Fuller et al. . |
| 6,013,385 | 1/2000 | DuBose . |
| 6,168,705 * | 1/2001 | Molter et al. ........................ 205/637 |

* cited by examiner

*Primary Examiner*—Gabrielle Brouillette
*Assistant Examiner*—Dah-Wei Yuan
(74) *Attorney, Agent, or Firm*—Fish & Richardson P.C.

(57) ABSTRACT

The invention relates to a fuel cell system with a hydrogen purification subsystem. The hydrogen purification subsystem can concentrate hydrogen from the fuel exhaust for recirculation or storage. The hydrogen purification subsystem can also concentrate hydrogen from a fuel supply for input into a fuel cell or for storage. The hydrogen purification subsystem can also concentrate hydrogen for quantitative comparison with a second stream containing hydrogen. The hydrogen purification subsystem can also charge a hydrogen storage device for system use such as meeting transient fuel cell load increases.

30 Claims, 9 Drawing Sheets

FUEL CELL SYSTEM WITH HYDROGEN PURIFICATION SUBSYSTEM

The invention relates generally to a fuel cell system with a hydrogen purification subsystem.

BACKGROUND OF THE INVENTION

A fuel cell can convert chemical energy to electrical energy by promoting a chemical reaction between two reactant gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the reactant gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of the reactant gases (the anode reactant gas) enters the anode flow field plate at the inlet region of the anode flow field plate and flows through the channels of the anode flow field plate toward the outlet region of the anode flow field plate. The other reactant gas (the cathode reactant gas) enters the cathode flow field plate at the inlet region of the cathode flow field plate and flows through the channels of the cathode flow field plate toward the cathode flow field plate outlet region.

As the anode reactant gas flows through the channels of the anode flow field plate, the anode reactant gas passes through the anode gas diffusion layer and interacts with the anode catalyst. Similarly, as the cathode reactant gas flows through the channels of the cathode flow field plate, the cathode reactant gas passes through the cathode gas diffusion layer and interacts with the cathode catalyst.

The anode catalyst interacts with the anode reactant gas to catalyze the conversion of the anode reactant gas to reaction intermediates. The reaction intermediates include ions and electrons. The cathode catalyst interacts with the cathode reactant gas and the reaction intermediates to catalyze the conversion of the cathode reactant gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and reactant gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Because electrons are formed at the anode side of the membrane electrode assembly, that means the anode reactant gas undergoes oxidation during the fuel cell reaction. Because electrons are consumed at the cathode side of the membrane electrode assembly, that means the cathode reactant gas undergoes reduction during the fuel cell reaction.

For example, when hydrogen and oxygen are the reactant gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \quad (1)$$

$$\tfrac{1}{2}O_2 + 2H^+ + 2e^- \rightarrow H_2O \quad (2)$$

$$H_2 + \tfrac{1}{2}O_2 \rightarrow H_2O \quad (3)$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

Typically only a portion of the fuel (e.g., reformate containing hydrogen) flowing through a fuel cell will react, so that the fuel gas exhaust from a fuel cell will generally contain some level of hydrogen. For example, the amount of hydrogen that is reacted may depend on factors including temperature, pressure, residence time, and catalyst surface area. For this reason, excess hydrogen may be sometimes fed to a fuel cell in order to increase the amount of reacting hydrogen to a level corresponding to a desired power output of the fuel cell. For example, it may be that 100 standard liters per minute (slm) of hydrogen must be reacted in a fuel cell to achieve a desired power output, but it is determined that 140 slm of hydrogen must be fed to the fuel cell to achieve this reaction of 100 slm of hydrogen. This system may be said to be running at 40% excess hydrogen at the anode inlet. In other terminology, this system may also be characterized as running at a stoichiometry of 1.4. For similar reasons, it may be desirable to supply the cathode side of the fuel cell with an excess of oxidant (e.g., air).

SUMMARY OF THE INVENTION

The invention relates to a fuel cell system with a hydrogen purification subsystem.

In one embodiment, the hydrogen purification subsystem removes hydrogen from the fuel gas output stream and transfers it to the fuel gas input stream. This increases the fuel cell system efficiency and decreases the amount of hydrogen wasted during use of the fuel cell system relative to an otherwise substantially identical fuel cell system having a design in which hydrogen contained in the fuel gas output stream is simply discarded.

In another embodiment, the hydrogen purification subsystem includes a membrane electrode assembly (MEA) that is distinct from the MEA's of the fuel cells in the fuel cell system. The hydrogen pumping MEA (HPMEA) has an anode side (the side from which hydrogen is pumped) and a cathode side (the side to which hydrogen is pumped). The cathode side is connected to the fuel inlet stream of the fuel cell system. The anode and cathode sides of the HPMEA each have an electrical connector in contact with a power source that provides a potential across the HPMEA. The polarity of the potential is positive on the anode side of the HPMEA and negative on the cathode side of the HPMEA. The membrane of the HPMEA can be a proton exchange membrane. It will be appreciated that the term "HPMEA" is used only to note the application of such an MEA for hydrogen pumping, and not to indicate its physical characteristics.

In one aspect, the HPMEA anode side can be connected to a fuel exhaust stream of a fuel cell. The HPMEA anode side can also be connected to a fuel supply system. The fuel supply system can be, as examples, a reformer or a fuel gas supply line.

In another aspect, the HPMEA cathode side can be connected to a hydrogen storage device. The hydrogen storage device can include, as examples, pressure vessels and other known hydrogen storage systems such as hydrogen storage alloys.

In another aspect, the hydrogen storage device can be connected to the fuel inlet stream of a fuel cell. The invention may also include a valve system having a first operational state wherein a concentrated hydrogen stream is flowed from the HPMEA cathode side to a hydrogen storage device where the concentrated hydrogen stream is isolated from the fuel inlet stream of the fuel cell. The valve system may also have a second operational state wherein the concentrated hydrogen stream is flowed from the HPMEA cathode side to the fuel inlet stream of the fuel cell, where the concentrated hydrogen stream is isolated from the hydrogen storage device. In another aspect, the hydrogen purification subsystem may include a controller connected to a hydrogen storage device pressure sensor. The controller can be adapted to actuate the valve system between the first and second operational states in response to a signal from the hydrogen storage device pressure sensor. In another aspect, the hydrogen purification subsystem can include a transient load sensor connected to the fuel cell, wherein a controller is connected to the transient load sensor and adapted to release a stored flow from the hydrogen storage device to the fuel inlet stream of the fuel cell in response to a signal from the transient load sensor. The transient load sensor can be, for example, a hydrogen concentration sensor. Other sensors are possible.

In another embodiment, the hydrogen purification subsystem includes an HPMEA having its cathode side connected solely to a hydrogen storage device. In one aspect, the HPMEA may have its anode side connected to a fuel exhaust stream of a fuel cell. In another aspect, the HPMEA may have its anode side connected to a fuel supply system of a fuel cell.

In another embodiment, as discussed herein, the HPMEA may be coupled with a comparison MEA having a concentrated side and a comparison side. The concentrated side may be connected to the cathode side of the HPMEA, and the comparison side may be connected to a fuel gas source. An electric potential may be applied across the HPMEA to induce hydrogen pumping, and a voltage measuring device may be used to measure the potential across the comparison MEA caused by the differential of hydrogen concentration on either side of the comparison MEA. The voltage may be correlated to the hydrogen concentration of the fuel gas source. The fuel gas source may be, as examples, an exhaust stream of a fuel cell, a reformer outlet stream, a fuel supply line, or in general a fuel gas line within a fuel cell system.

In another embodiment, the invention provides a method of manipulating hydrogen in a fuel cell system. In one aspect, a fuel exhaust stream of a fuel cell is flowed against a first side of an HPMEA. A potential may be applied across the HPMEA that is sufficient to induce electrochemical hydrogen pumping through the HPMEA. The resulting concentrated hydrogen stream may be flowed, as examples, to a fuel inlet stream of a fuel cell or to a hydrogen storage device.

Multiple hydrogen purification subsystems can be used within a single fuel cell system, for example, to concentrate fuel inlet gas while also concentrating a recirculated portion of the fuel exhaust gas.

Other advantages and features will become apparent from the following description of the preferred embodiments and the claims.

DETAILED DESCRIPTION

Figure 1:
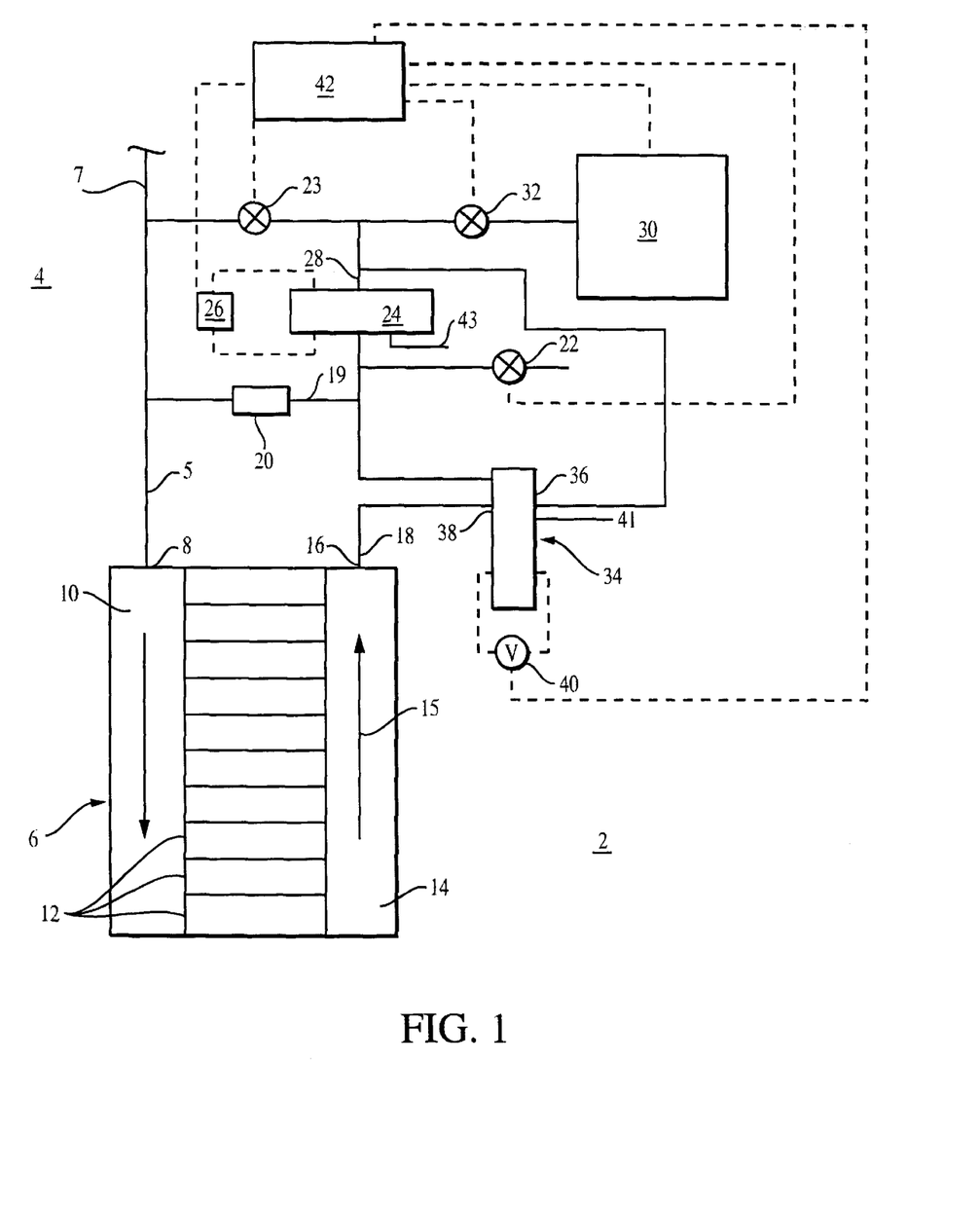
FIG. 1 is a schematic diagram of a fuel cell system with a hydrogen purification subsystem according to an embodiment of the invention.

Referring to FIG. 1, a schematic diagram is shown of a fuel cell system 2 with a hydrogen purification subsystem 4 according to an embodiment of the invention. Fuel cell stack 6 is shown indicating the direction of fuel gas 7 through the stack 6. Fuel gas 7 flows from fuel inlet line 5 through fuel gas inlet 8 into fuel inlet manifold 10. The fuel gas 7 travels through individual fuel cells 12 (see FIGS. 6–9 and accompanying discussion) and into fuel exhaust manifold 14. The fuel gas exhaust 15 exits the stack 6 through fuel gas outlet 16.

Fuel exhaust line 18 is circulated through device 34 (see discussion below) and connected to effluent gas recirculation (EGR) line 19. EGR fan 20 is located on line 19 to drive the recirculation. EGR line may also include a check valve (not shown) to prevent back flow from fuel inlet line 5 into fuel exhaust line 18. As an example, the inlet fuel gas 7 may initially contain about 40% hydrogen, and due to reaction of hydrogen in the fuel cell stack 6, the fuel gas exhaust 15 may contain about 11% hydrogen. It may be desirable to recirculate about 50% of the fuel gas exhaust 15. The rest could be sent to vent 22. Fuel exhaust line 18 is further connected to hydrogen pumping device 24. Hydrogen pumping device 24 is connected to power source 26 which provides an electric potential across the device 24. Hydrogen pumping device 24 has vent 43 to vent the fuel exhaust gas after its hydrogen is removed by device 24.

On the side of the hydrogen pumping device 24 opposite from the fuel exhaust line 18, the hydrogen pumping device 24 is connected to recirculation valve 23, which can be adjusted to select a portion of the hydrogen pumping device effluent 28 for recirculation into fuel inlet line 5. As discussed herein, the hydrogen pumping device effluent 28 may be substantially pure hydrogen. The hydrogen pumping device 24 is also connected to hydrogen storage device 30. Hydrogen storage device 30 may be a pressure vessel, or other hydrogen storage systems known in the art, such as a hydrogen storage alloy system. Valve 32 controls the flow to and from the hydrogen storage device 30. During normal operation, valve 32 may be closed and valve 23 may be opened. In this state, the hydrogen purification subsystem 4 serves to recirculate pure hydrogen from the fuel gas exhaust 15.

The subsystem 4 can also be used to charge the hydrogen storage device 30. For example, when valve 23 is closed and valve 32 is open, the hydrogen pumping device 24 can pressurize hydrogen storage device 30 (see discussion with respect to FIG. 5). Once pressurized, valve 32 can be shut to store the hydrogen. In one embodiment, in response to a transient load increase on the fuel cell system 2, valves 32 and 23 can be opened to provide a rapid increase in the amount of hydrogen available to the fuel cell stack 6. As an example, this may be advantageous if the fuel gas supply is not capable of rapidly increasing the available hydrogen. For example, where a reformer is used to provide a reformate fuel gas, depending on the design, it may be the case that there is a lag time before the available hydrogen from the reformer can be increased in response to a signal indicating a transient load increase. For example, it may take from 5 to 20 seconds for the reformer to reach a steady increased fuel output in response to a transient load increase.

In the embodiment shown in FIG. 1, the hydrogen pumping device effluent 28 is further connected to the concentrated side 36 of a comparison device 34. This connection may have a valve (not shown) to isolate comparison device 34 when storage device 30 is being pressurized. Comparison device 34 may include an MEA similar to hydrogen pumping device 24 (see FIG. 4). Comparison device 34 has a vent 41 to periodically purge the concentrated hydrogen stream between devices 24 and 34. Comparison side 38 of the comparison device 34 is connected to the fuel gas exhaust 15 from the stack 6. As discussed with respect to FIG. 4, voltage measuring device 40 measures the potential across fuel cell 34 that arises from the difference in hydrogen concentration on either side of the comparison device 34. The voltage measured by device 40 can be correlated to determine the partial pressure of hydrogen in fuel gas exhaust 15, which indicates the concentration of hydrogen in fuel gas exhaust 15. For example, the Nernst equation may be used to calculate the partial pressure of hydrogen on the fuel gas exhaust 15 side of the comparison device 40:

$$E = E_0 + (RT/nF)*\log_{10}(P_1/P_2) \qquad (3)$$

E—measured voltage;
$E_0$—reactant equilibrium potential
R—universal gas constant;
T—temperature;
n—number of electrons transferred;
F—Faraday constant;
$P_1$—hydrogen partial pressure of hydrogen pumping device effluent; and
$P_2$—partial pressure of hydrogen in the fuel gas exhaust stream.

As an example, a decrease in the hydrogen concentration of fuel gas exhaust 15 may indicate a transient load increase. This indication can be used, for example, to open hydrogen storage device 30 as previously discussed to provide increased hydrogen fuel in response to the load increase.

Controller 42 is shown connected to various components of subsystem 4. However, it will be appreciated that the present invention is not limited by any particular control scheme. It will further be appreciated that the schematic diagram shown in FIG. 1 is for illustrative purposes only, and does not limit the scope of the invention to a particular embodiment.

Figure 2:
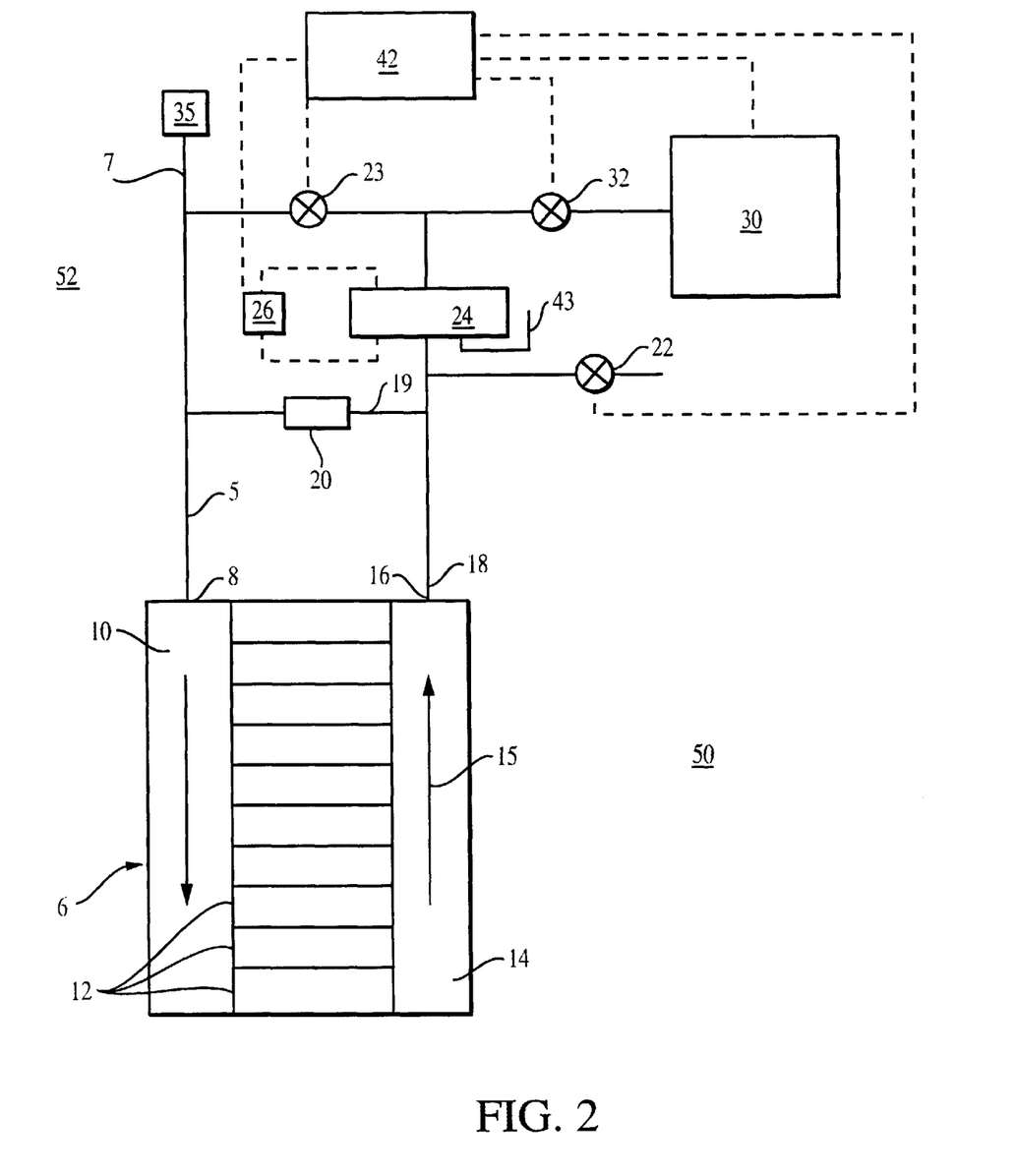
FIG. 2 is a schematic diagram of a fuel cell system with a hydrogen purification subsystem according to another embodiment of the invention.

Referring to FIG. 2, a schematic diagram is shown of a fuel cell system 50 with a hydrogen purification subsystem 52 according to an embodiment of the invention that does not include the comparison device 34. For example, the subsystem 52 may be actuated to utilize hydrogen storage device 30 in response to a transient load increase, where the load increase is measured by some other method, such as electronically. In other possible embodiments, the hydrogen purification subsystem of the invention may not include a hydrogen storage device. For example, the system may be used simply to provide a recirculated stream of pure hydrogen as previously discussed. In the embodiment shown in FIG. 2, the fuel inlet gas 7 is supplied by reformer 35. For example, reformer 35 may be used to convert a hydrocarbon fuel such natural gas or methanol into hydrogen, as known in the art.

Figure 3:
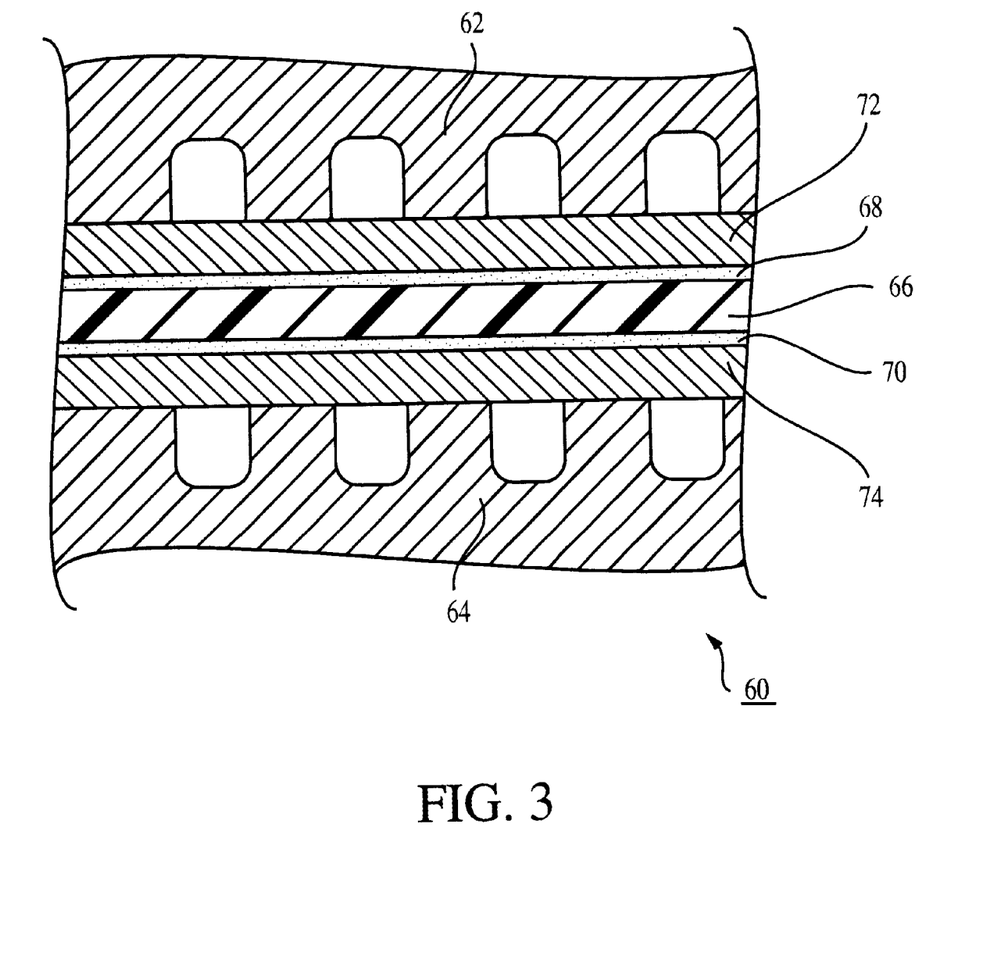
FIG. 3 is a cross-sectional view of a hydrogen pumping system according to an embodiment of the invention.

FIG. 3 shows an embodiment of a hydrogen pumping device 60. Hydrogen pumping device 60 includes a first flow field plate 62, a second flow field plate 64, an electrolyte 66, catalysts 68 and 70 and gas diffusion layers 72 and 74. Electrolyte 66 should be capable of allowing ions to flow therethrough while providing a substantial resistance to the flow of electrons. Electrolyte 66 is a solid polymer (e.g., a solid polymer ion exchange membrane), such as a solid polymer proton exchange membrane (e.g., a solid polymer containing sulfonic acid groups). Such membranes are commercially available from E.I. DuPont de Nemours Company (Wilmington, Del.) under the trademark NAFION. Alternatively, electrolyte 66 can also be prepared from the commercial product GORE-SELECT, available from W.L. Gore & Associates (Elkton, Md.).

Catalysts 68 and 70 can be formed of a material capable of interacting with hydrogen to form protons and electrons. Examples of such materials include, for example, platinum, platinum alloys, and platinum dispersed on carbon black. Catalyst layers 68 and 70 may be formed onto electrolyte 66. Alternatively, catalyst layers 68 and 70 may be applied to the surfaces of gas diffusion layers 72 and 74.

Gas diffusion layers 72 and 74 may be formed of a material that is both gas and liquid permeable material so that the fuel gas and any water condensing from the fuel gas or entrained therein can pass through the gas diffusion layers 72 and 74. Layers 72 and 74 should be electrically conductive so that electrons can flow from catalysts 68 and 70 to flow field plates 62 and 64, respectively. In some embodiments, the gas diffusion layers maybe omitted. In such cases, a power source (not shown) may be connected directly to either side of the membrane electrode assembly.

As previously discussed, an MEA refers to the sandwich of the electrolyte 66 within the catalyst layers 68 and 70. An MEA may be used with or without gas diffusion layers 72 and 74. Also, it will be appreciated that flow plates 62 and 64 are also not required features of a hydrogen pumping device. Other configurations are possible.

Figure 4:
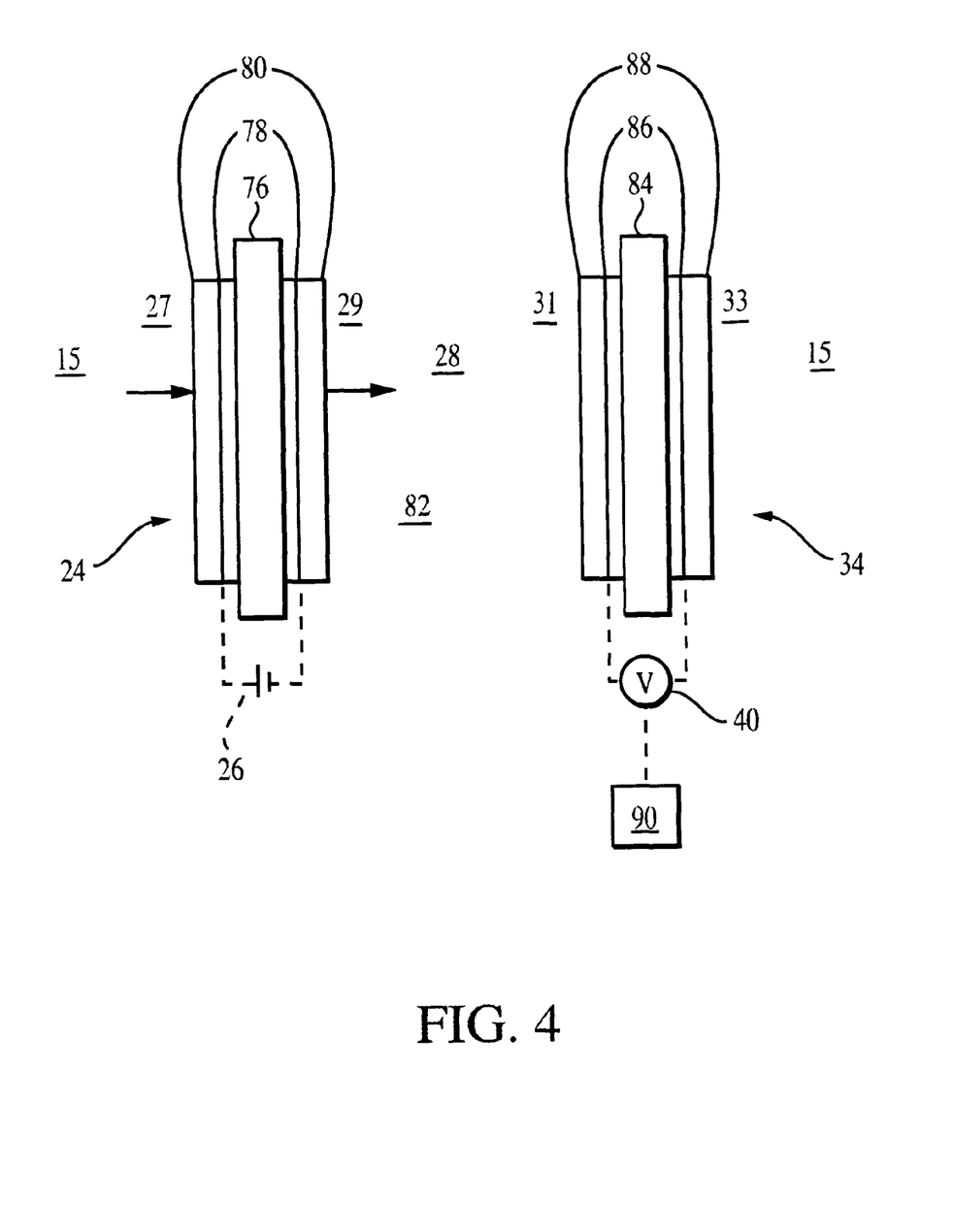
FIG. 4 is a schematic diagram of a portion of the hydrogen purification subsystem of FIG. 1.

Referring to FIG. 4, a schematic diagram is shown of a portion of the hydrogen purification subsystem of FIG. 1. Fuel gas exhaust 15 is brought into contact with hydrogen pumping device 24 which includes an MEA. In the example shown in FIG. 4, hydrogen pumping device 24 includes electrolyte 76, electrode layers 78, and gas diffusion layers 80. Power source 26 applies a potential across device 24, inducing the following reaction of the hydrogen in the fuel gas exhaust 15 as it contacts catalyst layer 78:

$$H_2 \rightarrow 2H^+ + 2e^- \quad (4)$$

The protons from the reaction flow through the electrolyte 76, and the electrons flow around the MEA 24 to re-form hydrogen according to the following reaction:

$$2H^+ + 2e^- \rightarrow H_2 \quad (5)$$

Effluent 28 from hydrogen pumping device 24 (FIG. 1) is substantially pure hydrogen because other components of fuel exhaust gas 15 are not passed through the MEA 24. Thus, a reference stream 82 of pure hydrogen is formed.

The amount of hydrogen transported through MEA 24 depends on the amount of current supplied by power source 26. Referring to the direction of hydrogen flow, the MEA 24 has an anode side 27 and a cathode side 29. The hydrogen reference stream 82 is connected to comparison membrane electrode assembly 34.

In the example shown in FIG. 4, MEA 34 includes electrolyte 84, electrode layers 86, and gas diffusion layers 88. The side of MEA 34 opposite from hydrogen reference stream 82 is connected to fuel gas exhaust 15. Referring to the direction of hydrogen flow, the MEA 24 has an concentrated side 31 and a comparison side 33. In this system, a potential is developed across MEA 34 due to the difference in hydrogen concentration between pure hydrogen reference stream 82 and fuel gas exhaust 15. Voltage measuring device 40 measures the potential across MEA 34 and computer 90 correlates this measurement into a hydrogen concentration measurement of the fuel gas exhaust 15.

The structure of the example shown in FIG. 4 is simplified. It will be appreciated that the hydrogen reference stream 82 may be isolated from other gasses in the fuel cell system to maintain its purity. It will also be appreciated that various valve and piping configurations may be implemented to accommodate various objectives, such as charging the hydrogen storage device 30 as previously described.

Figure 5:
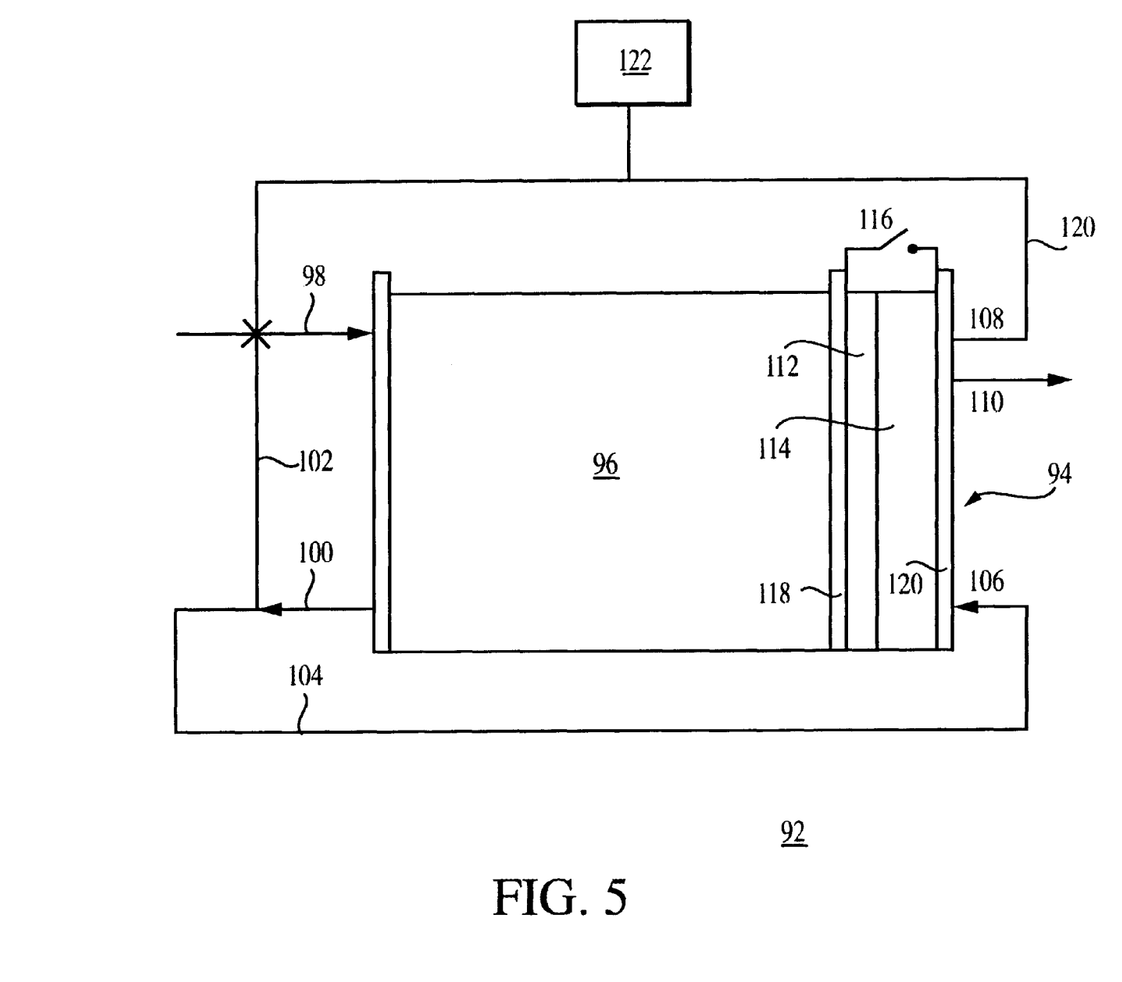
FIG. 5 is a schematic diagram of a fuel cell system with a hydrogen purification subsystem according to another embodiment of the invention.

Referring to FIG. 5, a schematic diagram is shown of a fuel cell system 92 with a hydrogen purification subsystem 94 according to another embodiment of the invention. Fuel cell stack 96 has fuel inlet stream 98 and fuel outlet stream 100. A first portion of fuel outlet stream is recirculated into fuel inlet stream 98 through first recirculation stream 102. A second portion of fuel outlet stream is flowed in a second recirculation stream 104 to hydrogen purification subsystem 94. Subsystem 94 has an subsystem inlet 106, a subsystem outlet 108, and a vent 110. Vent 110 disposes of what remains of second recirculation stream 104 after it has passed through subsystem 94. Subsystem 94 has at least one power supplying fuel cell 112 and at least one hydrogen pumping device 114.

Subsystem 94 may also have an activation switch 116 connected to electrical connectors 118 and 120. While power supplying fuel cell 112 is part of the fuel cell stack 96, it is electrically separated by electrical connector 118. In other words, when fuel cell stack 96 is in operation and switch 116 is closed, the power supplying fuel cell 112 generates a voltage potential across electrical connectors 118 and 120. In this way, a potential is provided across hydrogen pumping device 114 to induce hydrogen pumping. Where switch 116 is opened, the second recirculation stream 104 passes through subsystem 94 and out vent 110 without having hydrogen in stream 104 removed by the hydrogen pumping device.

For example, a voltage of 0.5 VDC across fuel cell 112 may result in about 7.5 cubic centimeters of hydrogen being "pumped" through hydrogen pumping device 114 for each amp of current flow.

Subsystem effluent stream 120 is connected to hydrogen storage device 122 and to the fuel inlet stream 98 of the stack 96. The subsystem effluent stream 120 and hydrogen storage device 122 may have valve configurations (not shown), for example, as discussed with respect to FIG. 1. Hydrogen storage device 122 may be, for example, a pressure vessel. Where it is desired to charge the pressure of hydrogen storage device 122, the current supplied to fuel cell 112 may be selected to produce a sufficient amount of hydrogen to result in the desired pressure. For example, it may be desirable for a pressure vessel hydrogen storage device 122 to have about 1 cubic foot of storage volume, and be charged at about 2 atmospheres of pressure.

Figure 6:
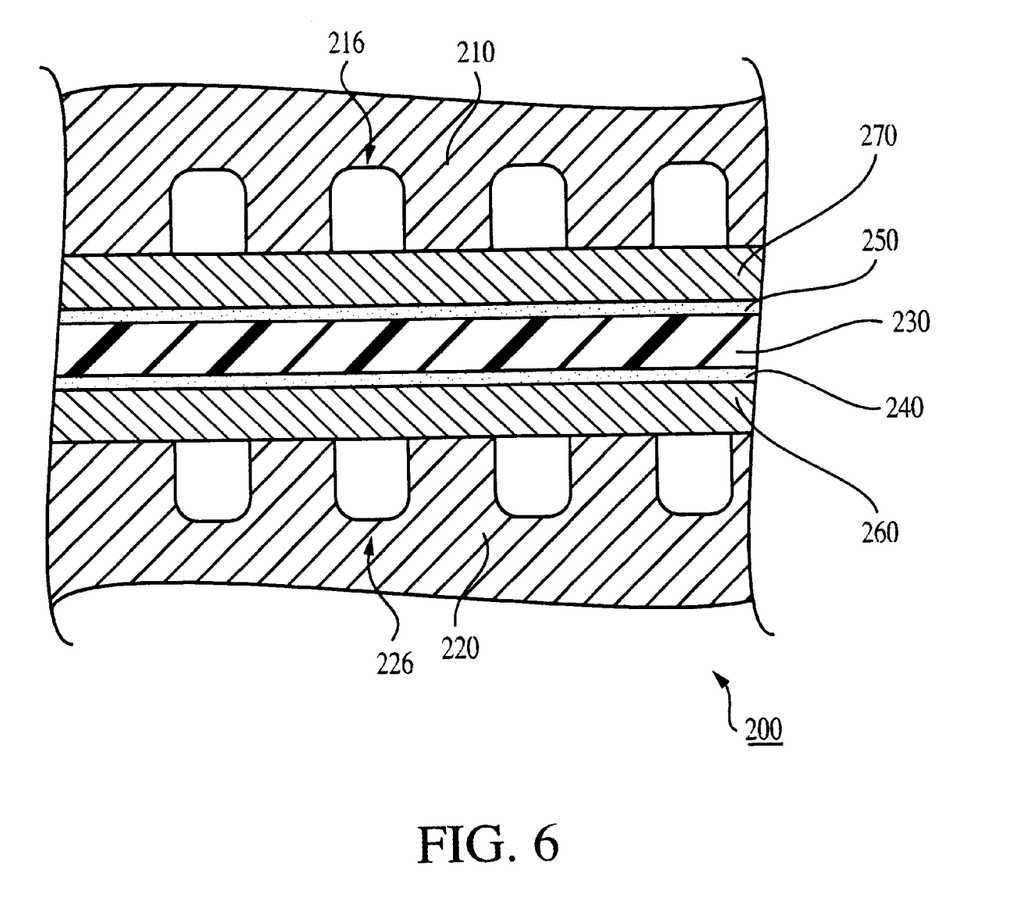
FIG. 6 is a cross-sectional view of a fuel cell according to an embodiment of the invention.

FIG. 6 shows an embodiment of a fuel cell 200 designed to catalyze the fuel cell reaction. Fuel cell 200 includes a cathode flow field plate 210, an anode flow field plate 220, a solid electrolyte 230, catalysts 240 and 250 and gas diffusion layers 260 and 270.

Electrolyte 230 should be capable of allowing ions to flow therethrough while providing a substantial resistance to the flow of electrons. Electrolyte 230 is a solid polymer (e.g., a solid polymer ion exchange membrane), such as a solid polymer proton exchange membrane (e.g., a solid polymer containing sulfonic acid groups). Such membranes are commercially available from E.I. DuPont de Nemours Company (Wilmington, Del.) under the trademark NAFION. Alternatively, electrolyte 230 can also be prepared from the commercial product GORE-SELECT, available from W.L. Gore & Associates (Elkton, Md.).

Catalyst 240 can be formed of a material capable of interacting with hydrogen to form protons and electrons. Examples of such materials include, for example, platinum, platinum alloys, and platinum dispersed on carbon black. Alternatively, the suspension is applied to the surfaces of gas diffusion layers 260 and 270 that face catalysts 240 and 250, respectively, and the suspension is then dried. The method of preparing catalyst 240 may further include the use of heat, pressure and temperature to achieve bonding.

Catalyst 250 can be formed of a material capable of interacting with oxygen, electrons and protons to form water. Examples of such materials include, for example, platinum, platinum alloys, and noble metals dispersed on carbon black. Catalyst 250 can be prepared as described above with respect to catalyst 240.

Gas diffusion layers 260 and 270 are formed of a material that is both gas and liquid permeable material so that the reactant gases (e.g., hydrogen and oxygen) and products (e.g., water) can pass therethrough. In addition, layers 260 and 270 should be electrically conductive so that electrons can flow from catalysts 240 and 250 to flow field plates 220 and 210, respectively.

Figure 7:
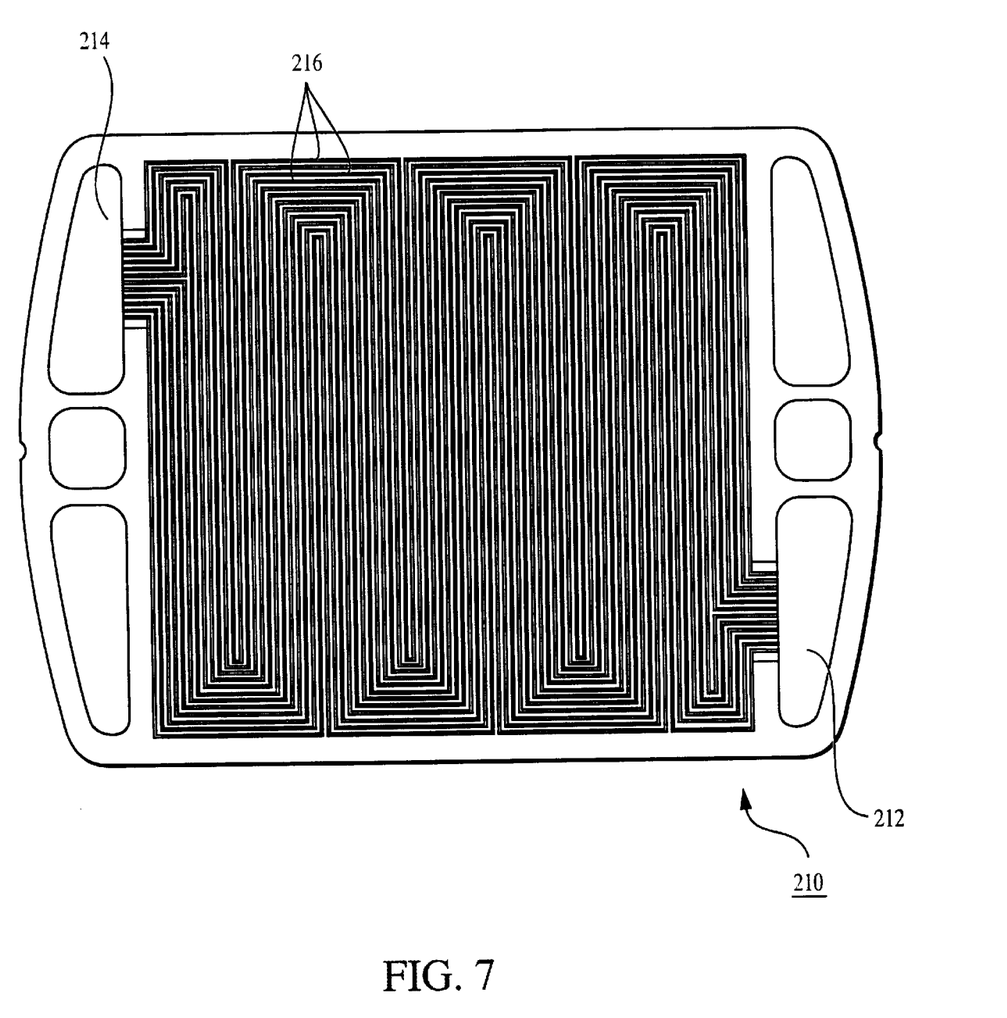
FIG. 7 is an elevational view of a cathode flow field plate according to an embodiment of the invention.

FIG. 7 shows an embodiment of cathode flow field plate 210 which is used to provide a flow path that allows the oxygen to interact with catalyst 250. Cathode 210 has an inlet 212, an outlet 214 and open-faced channels 216 that define a flow path for an oxidant gas from inlet 212 to outlet 214. An oxidant gas input stream (not shown) flows to inlet 212. As the oxidant gas flows along channels 216, the oxygen contained in the oxidant gas permeates gas diffusion layer 270 to interact with catalyst 250, electrons and protons to form water. The water can pass back through diffusion layer 270, enter the oxidant stream in channels 216, and exit fuel cell 200 through cathode flow field plate outlet 214.

Figure 8:
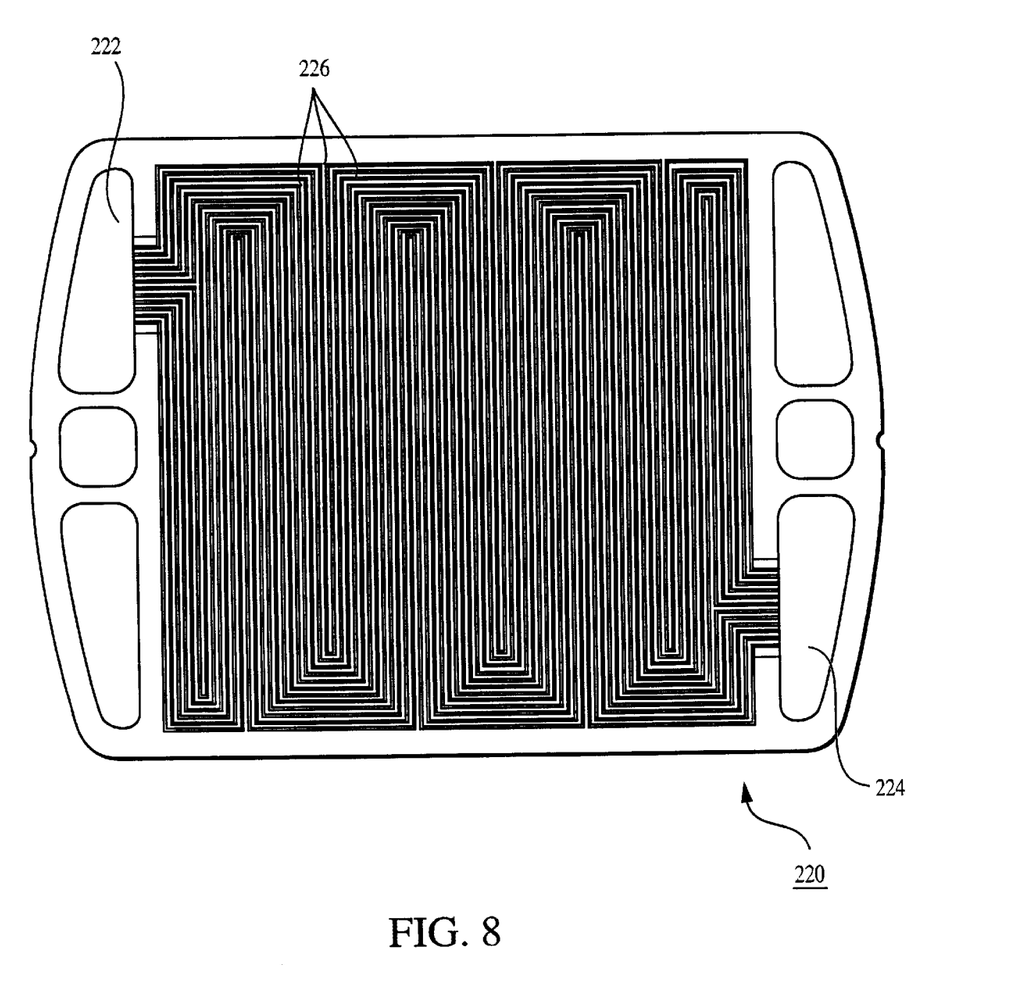
FIG. 8 is an elevational view of an anode flow field plate according to an embodiment of the invention.

FIG. 8 shows an embodiment of anode flow field plate 220 which is designed to provide a flow path for a fuel gas that allows the hydrogen to interact with catalyst 24. Cathode flow field plate 220 has an inlet 222, outlet 224 and open-faced channels 226 that define a flow path for a fuel gas from inlet 222 to outlet 224. A fuel gas input stream (not shown) flows to inlet 222. As the fuel flows along channels 226, the hydrogen contained in the fuel gas permeates gas diffusion layer 260 to interact with catalyst 240 to form protons and electrons. The protons pass through solid electrolyte 230, and the electrons pass are conducted through gas diffusion layer 260 to anode flow field plate 220, ultimately flowing through an external load to cathode flow field plate 210.

Figure 9:
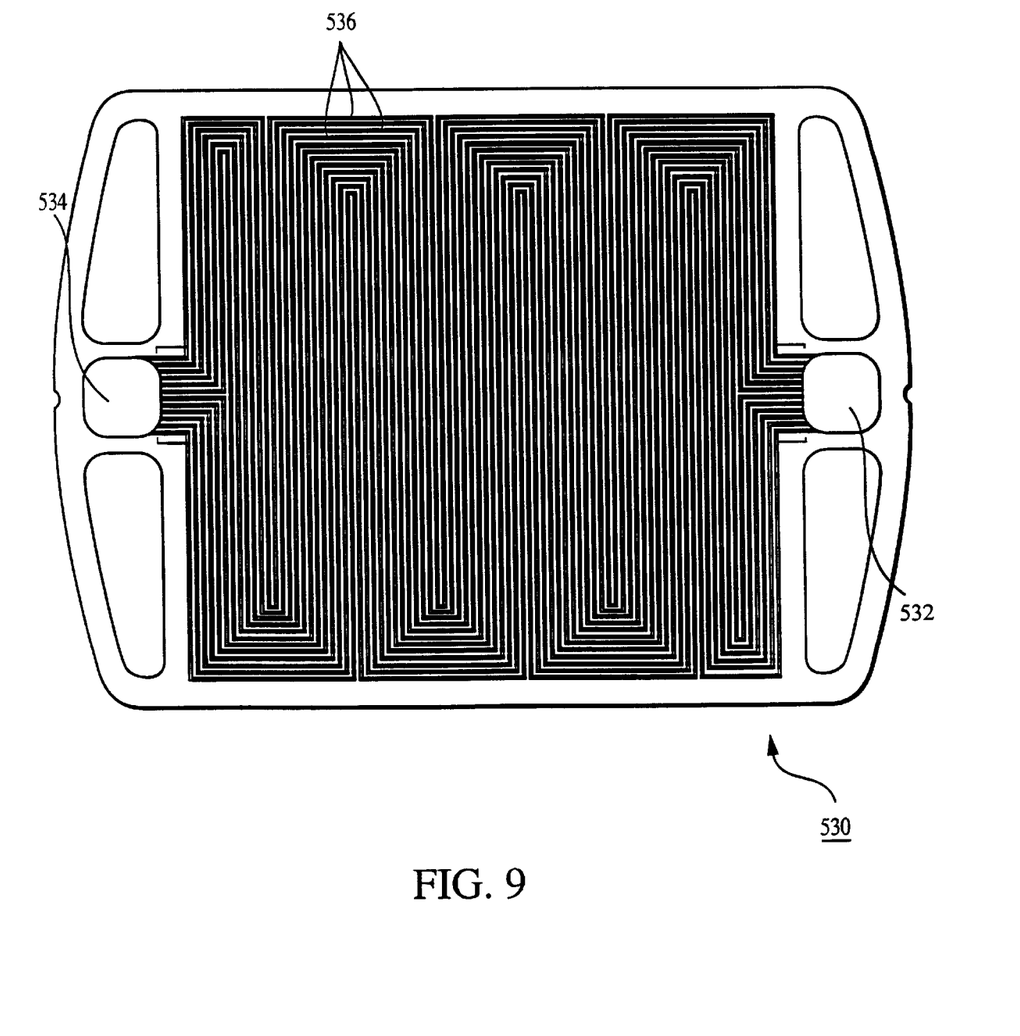
FIG. 9 is an elevational view of a coolant flow field plate according to an embodiment of the invention.

The heat produced during the fuel cell reaction is removed from fuel cell 200 by flowing a coolant through the fuel cell via a coolant flow field plate. FIG. 9 shows an embodiment of coolant flow field plate 530 having an inlet 532, an outlet 534 and open-faced channels 536 that define a flow path for coolant from inlet 532 to outlet 534. The coolant enters fuel cell 200 from a coolant input stream via inlet 532, flows along channels 536 and absorbs heat, and exits fuel cell 200 via outlet 534 to a coolant output stream (not shown). The coolant enters fuel cell 200 from coolant input stream 800 via inlet 532, flows along channels 536 and absorbs heat, and exits fuel cell 200 via outlet 534 to a coolant output stream (not shown).

Although certain embodiments and arrangements of cathode flow field plate 210, anode flow field plate 220 and coolant flow field plate 530 have been described herein, other embodiments and arrangements of these flow field plates can also be used. For example, other embodiments are disclosed in commonly assigned U.S. patent application Ser. No. 09/168,232, entitled "Fuel Cell Assembly Unit for Promoting Fluid Service and Design Flexibility", which is hereby incorporated by reference.

Moreover, while a fuel cell system containing a single fuel cell has been described herein, the fuel cell system is not limited to such single cell embodiments. Rather, the fuel cell system can include a plurality of fuel cells. Typically, the fuel cells in such systems are arranged in series by having the back surface of a cathode flow field plate in one fuel cell serve as the anode flow field plate in the next fuel cell in the series arrangement. A plurality of coolant flow field plates can also be used in these systems. Examples of fuel cell systems having a plurality of fuel cells and coolant flow field plates are described in U.S. patent application Ser. No. 09/168,232.

While certain embodiments of the invention, as well as their principals of operation, have been disclosed herein, the invention is not limited to these embodiments or these principals of operation. Other embodiments are in the claims.

What is claimed is:

1. A fuel cell system, comprising:
 a fuel cell having a fuel inlet and a fuel exhaust;
 a hydrogen purification subsystem including a membrane electrode assembly, the membrane electrode assembly having an anode side and an cathode side, the anode side being in fluid connection with the fuel exhaust of the fuel cell;
 the anode side and cathode side of the membrane electrode assembly each having an electrical connector;
 a power source connected to the anode and cathode side electrical connectors of the membrane electrode assembly, the power source providing a potential across the connectors.

2. The fuel cell system of claim 1, wherein the membrane electrode assembly comprises a sulphonated fluorocarbon polymer sandwiched on either side by a platinum based catalyst layer.

3. The fuel cell system of claim 1, wherein the membrane electrode assembly comprises a PEM fuel cell membrane electrode assembly.

4. The fuel cell system of claim 1, wherein the membrane electrode assembly anode side is connected to the fuel exhaust of the fuel cell.

5. The fuel cell system of claim 1, further comprising a fuel supply system, wherein the membrane electrode assembly anode side is in fluid connection to the fuel supply system.

6. The fuel cell system of claim 5, wherein the fuel supply system comprises a reformer.

7. The fuel cell system of claim 5, wherein the fuel supply system comprises a fuel gas supply line.

8. The fuel cell system of claim 4, further comprising a hydrogen storage device in fluid connection with the membrane electrode assembly cathode side.

9. The fuel cell system of claim 8, wherein the hydrogen storage device comprises a pressure vessel.

10. The fuel cell system of claim 5, further comprising a hydrogen storage device in fluid connection with the membrane electrode assembly cathode side.

11. The fuel cell system of claim 10, wherein the hydrogen storage device comprises a pressure vessel.

12. The fuel cell system of claim 8, wherein the hydrogen storage device is in fluid connection with the fuel inlet of the fuel cell.

13. The fuel cell system of claim 10, wherein the hydrogen storage device is in fluid connection with the fuel inlet of the fuel cell.

14. The fuel cell system of claim 12, further comprising a valve system having a first operational state wherein a first flow path connects the membrane electrode assembly cathode side to the hydrogen storage device, and a second operational state wherein a second flow path connects the membrane electrode assembly cathode side to the fuel inlet of the fuel cell.

15. The fuel cell system of claim 13, further comprising a valve system having a first operational state wherein a first flow path connects the membrane electrode assembly cathode side to the hydrogen storage device, and a second operational state wherein a second flow path connects the membrane electrode assembly cathode side to the fuel inlet of the fuel cell.

16. The fuel cell system of claim 14, further comprising a controller and a hydrogen storage device pressure sensor connected to the controller, the controller being adapted to actuate the valve system between the first and second operational states in response to a signal from the hydrogen storage device pressure sensor.

17. The fuel cell system of claim 16, further comprising a transient load sensor connected to the fuel cell, wherein the controller is connected to the transient load sensor and adapted to release a stored flow from the hydrogen storage device to the fuel inlet of the fuel cell in response to a signal from the transient load sensor.

18. The fuel cell system of claim 17, wherein the transient load sensor is a hydrogen concentration sensor.

19. A fuel cell system comprising:
a fuel cell having a fuel inlet and a fuel exhaust;
a hydrogen storage device;
a membrane electrode assembly having an anode side and an cathode side, the cathode side being in fluid connection with the hydrogen storage device, the anode side having an electrical connector and the cathode side having an electrical connector;
a power source connected to the anode and cathode side electrical connectors, the power source providing a potential across the connectors.

20. The fuel cell system of claim 19, wherein the hydrogen storage device comprises a pressure vessel.

21. The fuel cell system of claim 19, wherein the membrane electrode assembly anode side is connected to the fuel exhaust of the fuel cell.

22. The fuel cell system of claim 19, further comprising a fuel supply system in fluid connection to the membrane electrode assembly.

23. The fuel cell system of claim 22, wherein the fuel supply system comprises a reformer.

24. A fuel cell system comprising:
a fuel cell having a fuel inlet and a fuel exhaust;
a first membrane electrode assembly having an anode side and an cathode side;
a comparison membrane electrode assembly having a concentrated side and a comparison side, the concentrated side being in fluid connection with the cathode side of the first membrane electrode assembly, the comparison side being connected to a fuel gas source;
the anode side and cathode side of the first membrane electrode assembly each having an electrical connector;
a power source connected to the anode and cathode side electrical connectors, the power source providing a potential across the connectors;
the concentrated side and comparison side of the comparison membrane electrode assembly each having an electrical connector, the connectors each being connected to a voltage measuring device.

25. The fuel cell system of claim 24, wherein the fuel source comprises a fuel cell exhaust of the fuel cell.

26. The fuel cell system of claim 24, wherein the fuel source comprises a fuel processing system output stream.

27. A method of manipulating hydrogen in a fuel cell system, comprising:
flowing a fuel exhaust of a fuel cell across an anode side of a hydrogen purification subsystem membrane electrode assembly; and
applying a potential across the membrane electrode assembly sufficient to induce electrochemical hydrogen pumping through the membrane electrode assembly.

28. The method of claim 27, further comprising flowing a concentrated hydrogen stream from a cathode side of the membrane electrode assembly to a fuel inlet of a fuel cell.

29. The method of claim 27, further comprising flowing a concentrated hydrogen stream from a cathode side of the membrane electrode assembly to a hydrogen storage device.

30. A method of manipulating hydrogen in a fuel cell system, comprising:
flowing a fuel gas in a fuel cell system across an anode side of a hydrogen purifification subsystem membrane electrode assembly;
applying a potential across the membrane electrode assembly sufficient to induce electrochemical hydrogen pumping through the membrane electrode assembly; and
flowing a concentrated hydrogen stream from a cathode side of the membrane electrode assembly to a hydrogen storage device.

* * * * *